United States Patent
Balasubramanian et al.

(10) Patent No.: US 11,716,753 B2
(45) Date of Patent: Aug. 1, 2023

(54) FEEDBACK METHODS FOR SUBBAND FULL DUPLEX SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/158,993

(22) Filed: Jan. 26, 2021

(65) Prior Publication Data

US 2022/0240274 A1     Jul. 28, 2022

(51) Int. Cl.
*H04W 72/12*     (2023.01)
*H04W 72/566*    (2023.01)
*H04L 5/14*      (2006.01)
*H04L 1/1812*    (2023.01)

(52) U.S. Cl.
CPC ......... *H04W 72/566* (2023.01); *H04L 5/1423* (2013.01); *H04L 1/1812* (2013.01)

(58) Field of Classification Search
CPC . H04W 72/1247; H04L 5/1423; H04L 1/1812
See application file for complete search history.

(56) References Cited

U.S. PATENT DOCUMENTS

| | | | | |
|---|---|---|---|---|
| 10,992,424 B2* | 4/2021 | Lee | ...................... | H04L 5/0053 |
| 11,050,543 B1* | 6/2021 | Balasubramanian | | |
| | | | | H04L 5/0023 |
| 11,108,505 B2* | 8/2021 | Babaei | ................ | H04W 72/042 |
| 11,178,578 B2* | 11/2021 | Huang | ................. | H04W 28/26 |
| 11,375,476 B2* | 6/2022 | Wu | ................... | H04W 72/0446 |
| 2018/0262302 A1* | 9/2018 | Bergström | ............ | H04L 1/1896 |

(Continued)

FOREIGN PATENT DOCUMENTS

| | | | | |
|---|---|---|---|---|
| CN | 114208371 A | * | 3/2022 | ........... H04L 1/1671 |
| EP | 3926871 A1 | * | 12/2021 | ........... H04L 1/0027 |

(Continued)

OTHER PUBLICATIONS

International Search Report and Written Opinion—PCT/US2021/063626—ISA/EPO—dated Mar. 31, 2022.

(Continued)

*Primary Examiner* — Jay P Patel
(74) *Attorney, Agent, or Firm* — Procopio, Cory, Hargreaves & Savitch LLP

(57) ABSTRACT

A configuration to enable a UE operating as a full duplex device to transmit or receive feedback to or from other full duplex wireless devices or half duplex wireless devices. The apparatus allocates one or more sets of feedback resources, in association with a second UE, for transmission or reception of feedback message. The apparatus determines to transmit or receive the feedback message on a first resource set of the one or more sets of feedback resources based on a priority of the feedback message or a priority of a feedback resource set to transmit or receive a feedback message. The apparatus transmits or receives the feedback message based on the priority of the feedback message or the feedback resource set.

30 Claims, 9 Drawing Sheets

(56) References Cited

U.S. PATENT DOCUMENTS

| | | | |
|---|---|---|---|
| 2019/0387578 A1* | 12/2019 | Shrestha | H04L 5/0094 |
| 2020/0106566 A1* | 4/2020 | Yeo | H04W 28/04 |
| 2020/0228248 A1* | 7/2020 | Islam | H04L 1/1861 |
| 2020/0275463 A1 | 8/2020 | Gulati et al. | |
| 2020/0295883 A1* | 9/2020 | Lee | H04L 1/1887 |
| 2020/0351057 A1* | 11/2020 | Yeo | H04L 27/2646 |
| 2021/0014010 A1* | 1/2021 | Babaei | H04L 1/1642 |
| 2021/0014831 A1* | 1/2021 | Ryu | H04W 72/0493 |
| 2021/0028891 A1* | 1/2021 | Zhou | H04L 1/1819 |
| 2021/0028910 A1* | 1/2021 | Cheng | H04L 5/0094 |
| 2021/0050950 A1* | 2/2021 | Zhou | H04W 72/042 |
| 2021/0099269 A1* | 4/2021 | Wu | H04L 1/1854 |
| 2021/0099974 A1* | 4/2021 | Wu | H04L 5/0055 |
| 2021/0105100 A1* | 4/2021 | Zhou | H04L 1/1671 |
| 2021/0105126 A1* | 4/2021 | Yi | H04W 72/21 |
| 2021/0105728 A1* | 4/2021 | Nguyen | H04W 8/24 |
| 2021/0105768 A1* | 4/2021 | Nguyen | H04W 72/0446 |
| 2021/0136781 A1* | 5/2021 | Hosseini | H04W 72/1242 |
| 2021/0144682 A1* | 5/2021 | Baghel | H04L 5/0055 |
| 2021/0153169 A1* | 5/2021 | Lin | H04L 1/1819 |
| 2021/0195623 A1* | 6/2021 | Xu | H04W 72/1242 |
| 2021/0218503 A1* | 7/2021 | Babaei | H04L 1/1812 |
| 2021/0226735 A1* | 7/2021 | Lee | H04L 5/0064 |
| 2021/0266869 A1* | 8/2021 | Jeong | H04W 76/27 |
| 2021/0314104 A1* | 10/2021 | Yin | H04L 1/1812 |
| 2021/0321396 A1* | 10/2021 | Li | H04L 1/1896 |
| 2021/0344451 A1* | 11/2021 | Hedayat | H04L 1/1812 |
| 2021/0351875 A1* | 11/2021 | Babaei | H04L 1/1854 |
| 2021/0376966 A1* | 12/2021 | Sengupta | H04L 1/1829 |
| 2021/0377912 A1* | 12/2021 | El Hamss | H04L 1/1819 |
| 2021/0377963 A1* | 12/2021 | Wang | H04L 1/1896 |
| 2021/0391955 A1* | 12/2021 | He | H04L 1/1861 |
| 2022/0022189 A1* | 1/2022 | Huang | H04L 5/001 |
| 2022/0046692 A1* | 2/2022 | Huang | H04L 1/1812 |
| 2022/0053496 A1* | 2/2022 | Yu | H04L 1/1861 |
| 2022/0077967 A1* | 3/2022 | Zhou | H04L 5/0055 |
| 2022/0085956 A1* | 3/2022 | Yin | H04L 7/06 |
| 2022/0086032 A1* | 3/2022 | Park | H04W 72/1289 |
| 2022/0095200 A1* | 3/2022 | Hosseini | H04B 17/318 |
| 2022/0095238 A1* | 3/2022 | Huang | H04L 5/0053 |
| 2022/0103292 A1* | 3/2022 | Hwang | H04W 72/0406 |
| 2022/0103300 A1* | 3/2022 | Sun | H04L 5/0064 |
| 2022/0104262 A1* | 3/2022 | Miao | H04W 72/1289 |
| 2022/0109527 A1* | 4/2022 | Hwang | H04L 5/0055 |
| 2022/0110185 A1* | 4/2022 | Shi | H04W 52/028 |
| 2022/0124719 A1* | 4/2022 | Wu | H04L 1/1854 |
| 2022/0150942 A1* | 5/2022 | Xu | H04W 72/1284 |
| 2022/0173840 A1* | 6/2022 | Wang | H04W 72/10 |
| 2022/0183024 A1* | 6/2022 | Andersson | H04L 1/1812 |
| 2022/0200742 A1* | 6/2022 | Li | H04L 1/1854 |
| 2022/0337355 A1* | 10/2022 | Do | H04W 72/20 |
| 2022/0386247 A1* | 12/2022 | Liu | H04W 52/325 |

FOREIGN PATENT DOCUMENTS

| | | | | |
|---|---|---|---|---|
| EP | 3958489 A1 * | 2/2022 | | H04L 1/1812 |
| EP | 3958633 A1 * | 2/2022 | | H04L 1/1607 |
| KR | 20200144055 A | 12/2020 | | |
| WO | WO-2012044088 A2 * | 4/2012 | | H04B 7/0417 |
| WO | WO-2020068973 A1 * | 4/2020 | | H04L 1/1819 |
| WO | WO-2020201385 A1 * | 10/2020 | | H04L 1/0003 |
| WO | WO-2020218903 A1 * | 10/2020 | | H04L 1/1812 |
| WO | WO-2021006672 A1 * | 1/2021 | | H04L 1/1812 |
| WO | WO-2021013180 A1 * | 1/2021 | | H04L 1/1812 |
| WO | WO-2021021892 A1 * | 2/2021 | | H04W 72/1242 |
| WO | WO-2021027563 A1 * | 2/2021 | | |
| WO | WO-2021028565 A2 * | 2/2021 | | H04J 13/00 |
| WO | WO-2021028872 A1 * | 2/2021 | | H04L 5/0042 |
| WO | WO-2021028873 A1 * | 2/2021 | | H04L 5/0042 |
| WO | WO-2021030561 A1 * | 2/2021 | | H04L 5/0005 |
| WO | WO-2021032018 A1 * | 2/2021 | | H04L 1/1809 |
| WO | WO-2021060958 A1 * | 4/2021 | | H04L 1/1607 |
| WO | WO-2021062804 A1 | 4/2021 | | |
| WO | WO-2021071192 A1 * | 4/2021 | | |
| WO | WO-2021071194 A1 * | 4/2021 | | |
| WO | WO-2021088009 A1 * | 5/2021 | | H04L 5/0053 |
| WO | WO-2021088010 A1 * | 5/2021 | | |
| WO | WO-2021090248 A1 * | 5/2021 | | |
| WO | WO-2021091320 A1 * | 5/2021 | | |
| WO | WO-2021141468 A1 * | 7/2021 | | |
| WO | WO-2021142583 A1 * | 7/2021 | | |
| WO | WO-2021147104 A1 * | 7/2021 | | |
| WO | WO-2021152804 A1 * | 8/2021 | | |
| WO | WO-2021152805 A1 * | 8/2021 | | |
| WO | WO-2022009346 A1 * | 1/2022 | | |
| WO | WO-2022009347 A1 * | 1/2022 | | |
| WO | WO-2022073010 A1 * | 4/2022 | | |

OTHER PUBLICATIONS

TCL Communication: "Physical Layer Procedures for Sidelink", 3GPP Draft, 3GPP TSG RAN WG1 Meeting #98B, R1-1910413, vol. RAN WG1, No. Chongqing, China, Oct. 4, 2019 (Oct. 4, 2019), XP051808187, 15 Pages, Retrieved from the Internet: URL: https//ftp.3gpp.org/tsg_ran/WG1_RL1/TSGR1_98b/Docs/R1-1910413.zip. p. 3-p. 5 p. 9-p. 12.

* cited by examiner

FEEDBACK METHODS FOR SUBBAND FULL DUPLEX SYSTEMS

BACKGROUND

Technical Field

The present disclosure relates generally to communication systems, and more particularly, to a configuration for feedback for subband full duplex systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus allocates one or more sets of feedback resources, in association with a second UE, for transmission or reception of feedback messaging. The apparatus determines to transmit or receive the feedback message on a first resource set of the one or more sets of feedback resources based on a priority of the feedback message or a priority of the feedback message for a feedback resource set. The apparatus transmits or receives the feedback message based on the priority of the feedback message or the feedback resource set.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
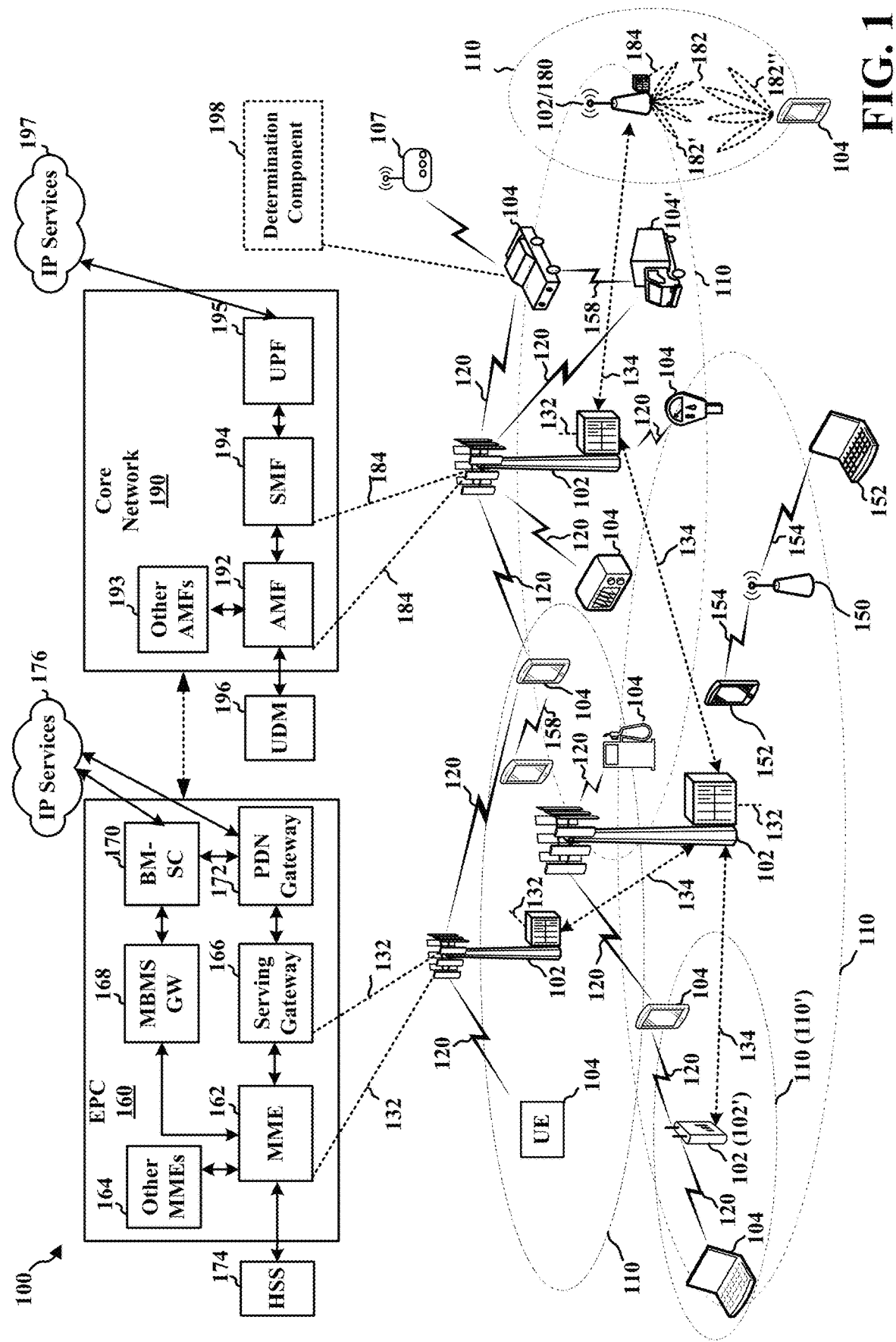
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may be configured to determine to transmit or receive feedback to or from other full duplex wireless devices or half duplex wireless devices. For example, the UE 104 may comprise a determination component 198 configured to determine to transmit or receive feedback message on a first resource set in connection with a second UE. The UE 104 may allocate one or more sets of feedback resources, in association with a second UE, for transmission or reception of feedback message. The UE 104 may determine to transmit or receive the feedback message on a first resource set of the one or more sets of feedback resources based on a priority of the feedback message or a feedback resource set. The UE 104 may transmit or receive the feedback message based on the priority of the feedback message or the feedback resource set.

Figure 2:
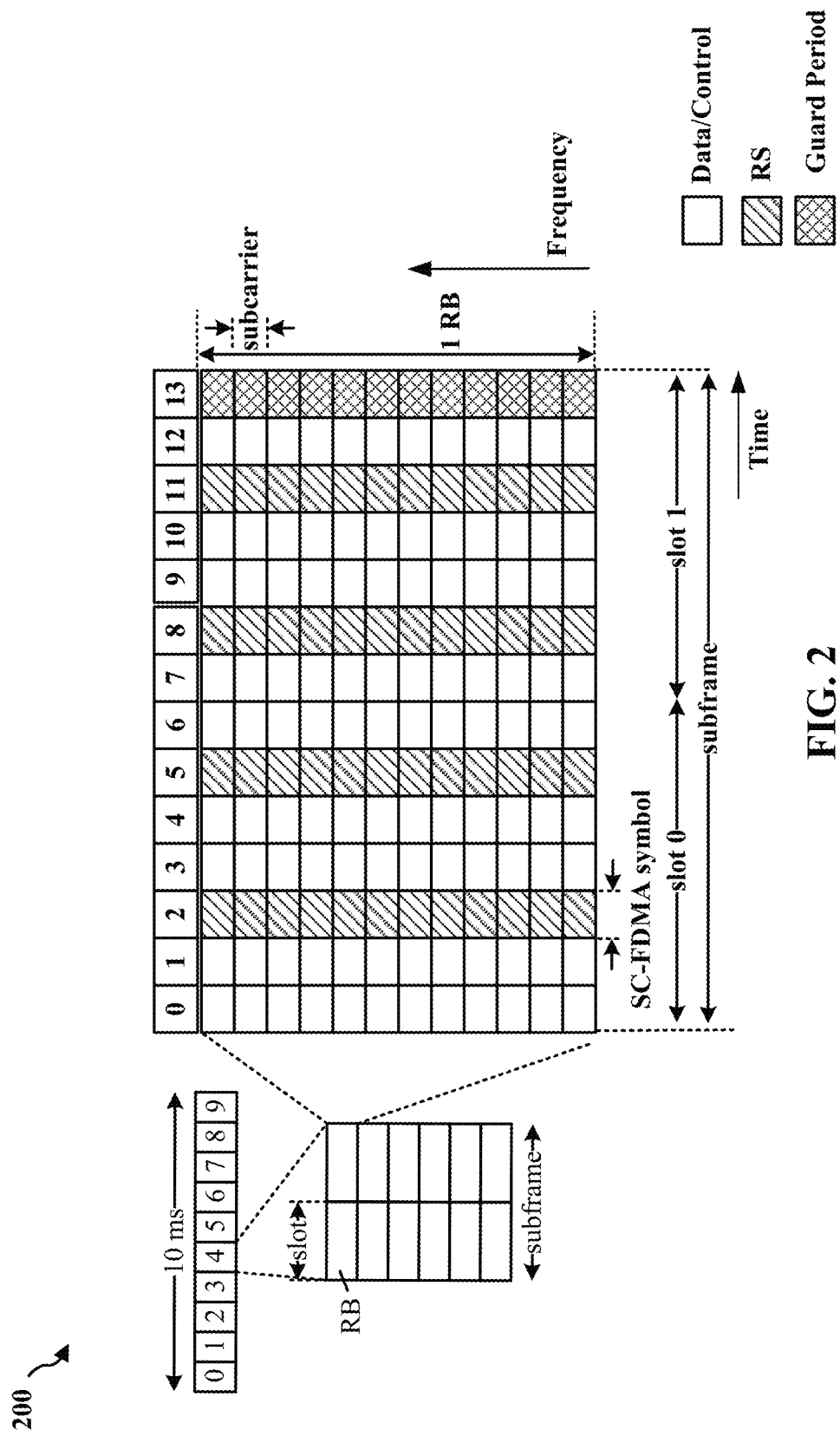
FIG. 2 illustrate example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
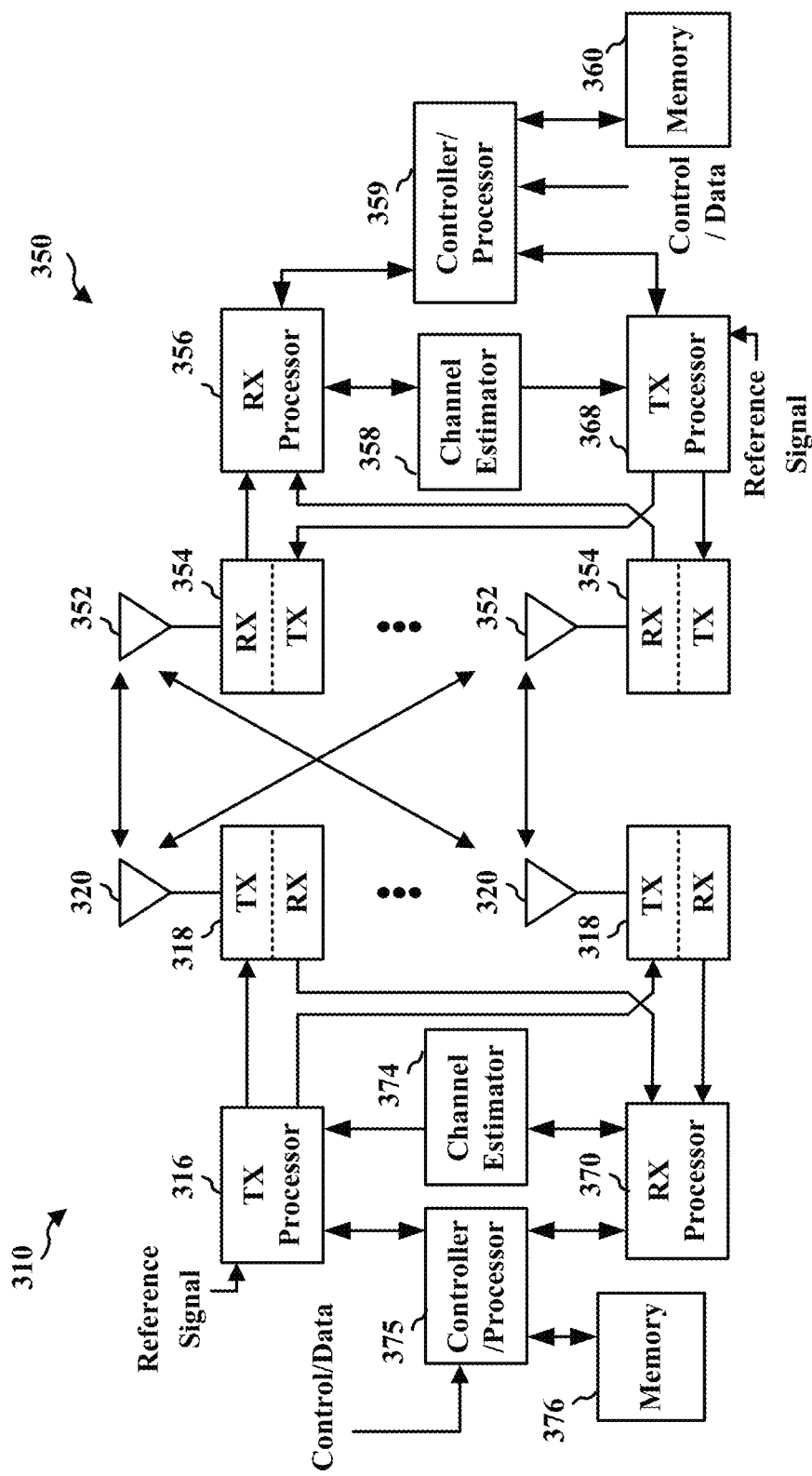
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

Figure 4:
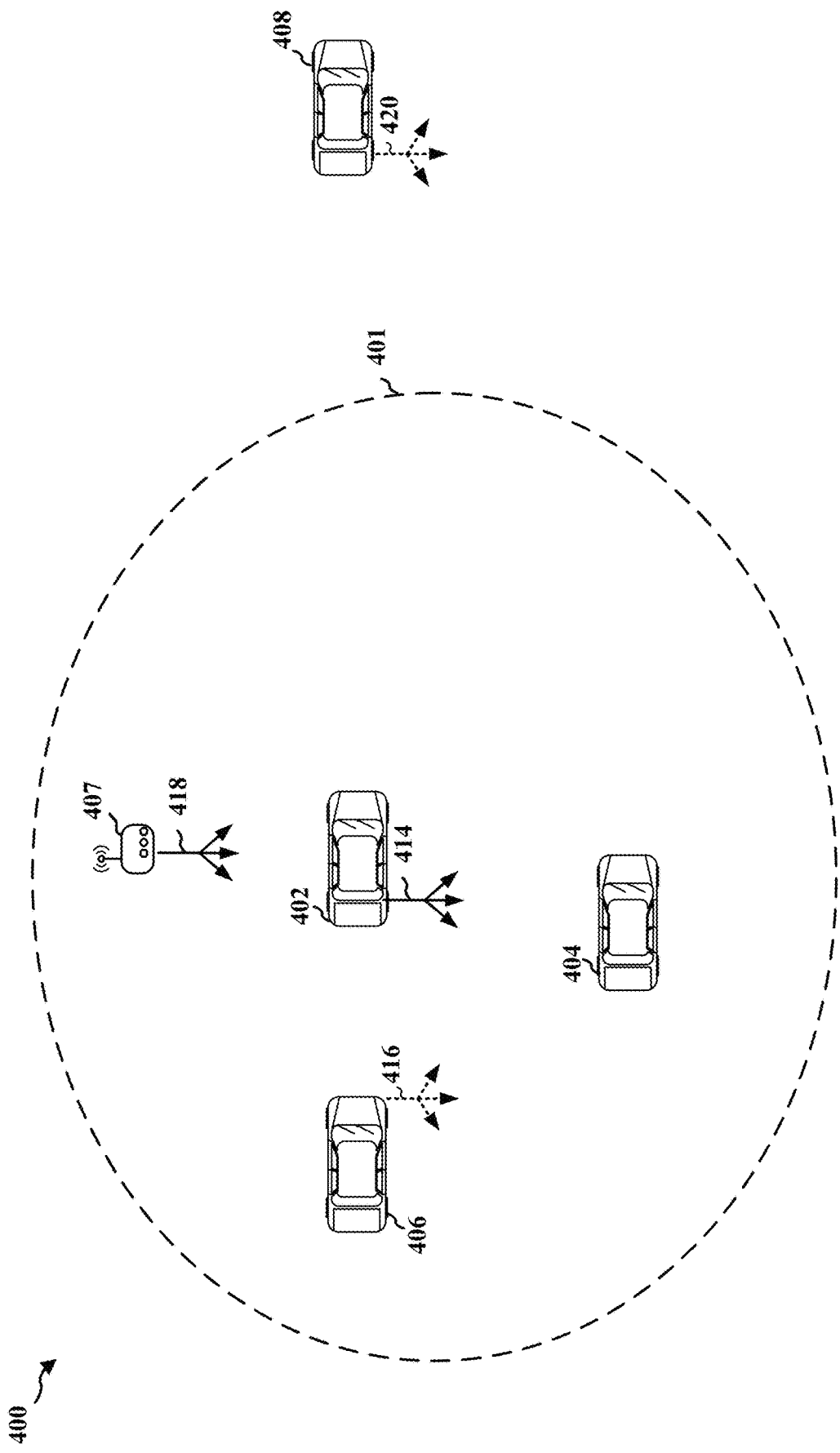
FIG. 4 is a diagram illustrating an example of a first device and a second device involved in wireless communication based, e.g., on sidelink communication.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a determination component, similar to 198 described in connection with FIG. 1.

Enabling full duplex techniques in V2X and/or non-V2X systems may have advantages and challenges. An increased spectral efficiency may be possible due to concurrent transmission and reception that may enable V2X systems to share large payloads. However, some wireless communications systems (e.g., NR V2X systems) may address instances where half duplex only vehicle UEs (VUEs) are in the system. As such, it may be advantageous to develop full duplex systems for VUEs. There may be practical challenges involved in realizing a full duplex system for VUEs, such as but not limited to self interference.

Figure 5:
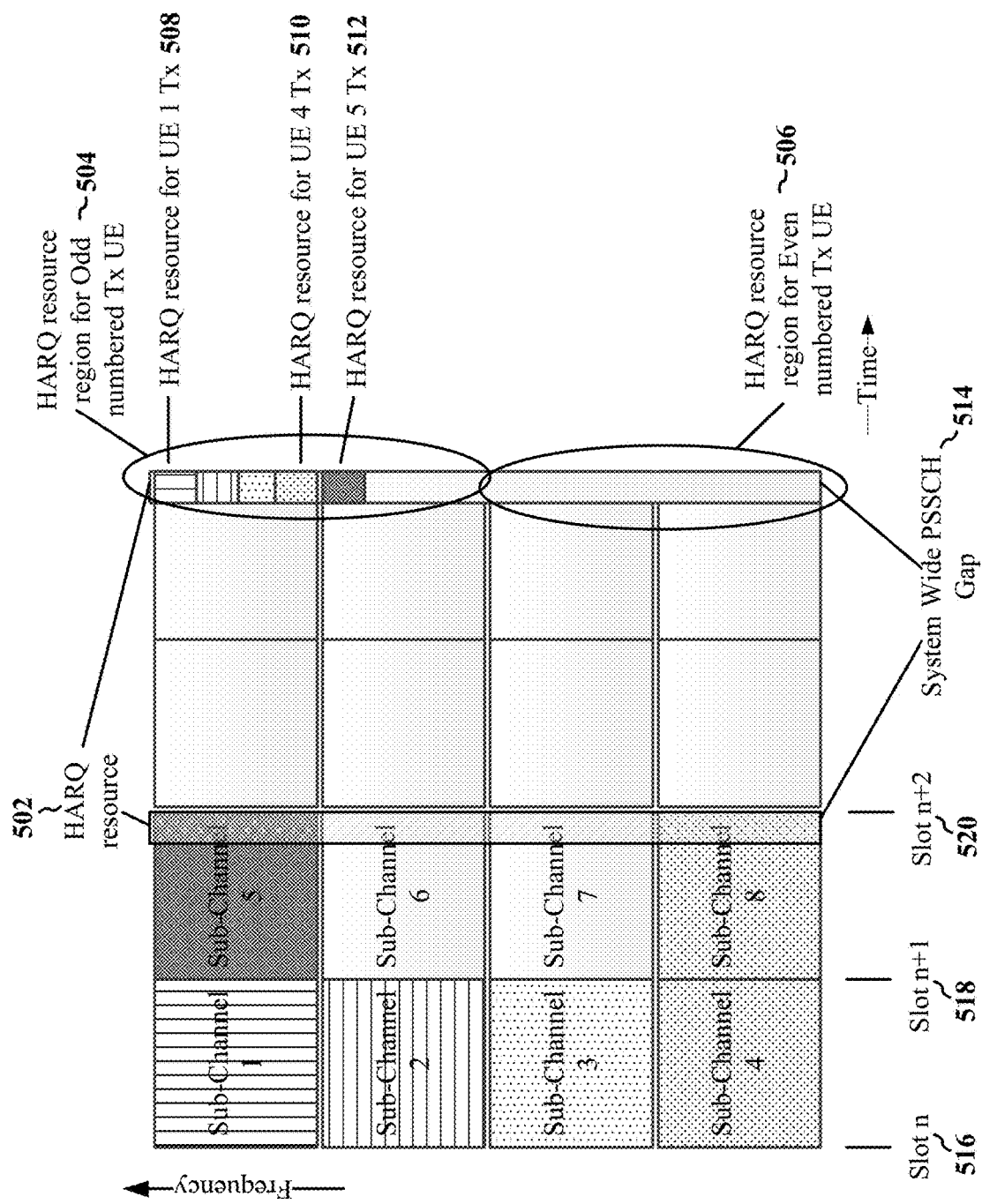
FIG. 5 is a diagram illustrating an example of a slot structure for feedback resources.

Feedback channels (e.g., physical shared feedback channel (PSFCH)) are present for half duplex systems. With reference to diagram 500 of FIG. 5, the diagram 500 may include a HARQ resource 502, a HARQ resource region 504 for odd numbered transmissions from the UE (e.g., 508, 510, 512), a HARQ resource region 506 for even numbered transmissions from the UE, a system wide PSSCH gap 514. The diagram 500 further includes multiple slots (e.g., 516, 518, and 520). In the diagram 500 of FIG. 5 may include a mapping between the subchannels (e.g., subchannel 1-8), which are the resources where the UE may transmit, and the resources in which the UE may expect a feedback (e.g., 504 and 506). A receiver UE may transmit a feedback on a resource based on the subchannel the UE received the data (e.g., PSSCH), and the transmission identifier of the UE may be inferred from the SCI.

In some instances, a subband based full duplex UE may intend to transmit and receive feedback to or from other full duplex UEs or half duplex UEs. However, the feedback channels of the subband based full duplex UE should be configured to accommodate for instances of transmitting or receiving feedback from either full duplex UE or half duplex UEs, such that the full duplex UE may efficiently transmit or receive feedback from either full duplex UEs or half duplex UEs. Aspects presented herein provide a configuration for a subband based full duplex UE to transmit or receive feedback to or from other full duplex UEs or half duplex UEs.

In some instances, one or more sets of feedback resources may be allocated where the full duplex UE may transmit or receive feedback on a resource set. Each resource set may contain one or more contiguous PRBs. The resource sets may be separated by a guard band. The subband full duplex UE may either transmit or receive on a resource set. For example, if the subband full duplex UE transmits feedback on one resource set, then the subband full duplex UE may transmit feedback or receive feedback on the other resource set. In some instances, the decision to transmit or receive on a feedback resource set may depend on a priority of the message for which the feedback is to be transmitted or received, the ability of the UE to enable transmission and reception of feedback concurrently, or whether transmission or reception is prioritized on a feedback resource set.

Figure 6:
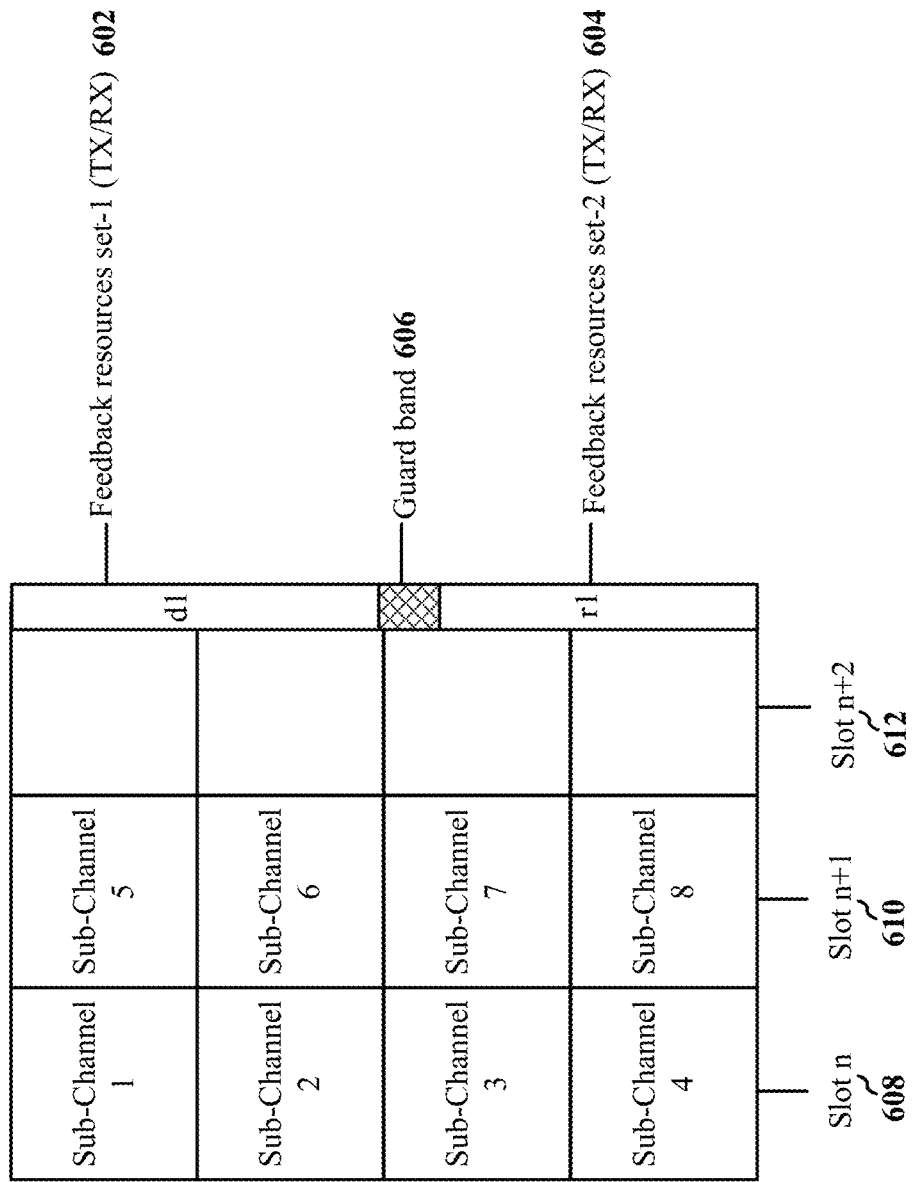
FIG. 6 is a diagram illustrating an example of a slot structure for feedback resources.

FIG. 6 illustrates a diagram 600 of a slot structure for feedback resources. The diagram 600 includes a first set of feedback resources d1 602, a second set of feedback resources r1 604, and a guard band 606 between the first set of feedback resources 602 and the second set of feedback resources 604. The diagram 600 includes a plurality of subchannels (e.g., sub-channel 1-8) over multiple slots (e.g., 608, 610, 612). In some aspects, a priority to transmit or receive messages for which feedback is to be provided may be based on a resource set basis. In some aspects, the subband full duplex UE may compare the priority messages for which feedback is to be transmitted or received on the first set of feedback resources d1 602 and the second set of feedback resources r1 604 separately. The subband full duplex UE decides independently whether it may transmit or receive feedback in d1 602 or r1 604. For example, let f1 be a feedback message to be received on d1 602, f2 is a feedback message to be transmitted on d1 602, f3 is a feedback message to be transmitted on r1 604, and f4 is a feedback message to be received on r1 604. The message corresponding to the feedback message may have a priority p1, p2, p3, p4, respectively. In some aspects, the priorities may be configured such that the priority p1 is greater than the priority p2 (e.g., p1>p2), and the priority p3 is less than the priority p4 (e.g., p3<p4). The subband full duplex UE may determine, independently, whether to transmit or receive on d1 602 or r1 604 based on the priority of the feedback messages. As such, on resource d1, since p1>p2, then the UE may decide to receive the feedback message, such that the UE receives the feedback message f1 and drops the transmission of feedback message f2. On resource r1, since p3<p4, then the UE may decide to receive the feedback message, such that the UE receives the feedback message f4 and drops the transmission of the feedback message f3. In this example, the UE ends up receiving on both resources d1 602 and r1 604, due to the decisions for determining whether to transmit or receive were made independent of each other.

In some aspects, the subband full duplex UE may be configured to transmit and receive feedback concurrently. For example, the subband full duplex UE may compare the priority of messages for which feedback is to be transmitted or received on resources d1 602 and r1 604 and may decide jointly whether to transmit or receive feedback on d1 602 and r1 604. In some aspects, the UE may decide to make d1 602 to be the transmit feedback resource and r1 604 to be the receive feedback resource, such that the UE may be able to transmit and receive feedback concurrently. In some aspects, the UE may decide whether to transmit or receive on resource d1 602. Based on the outcome of this decision, the UE may decide to transmit or receive on r1 604. In such aspect, the UE may determine the outcome of the decision beginning with resource d1 602, which the UE may determine to have a higher priority than the resource r1 604. If the UE decides to transmit on resource d1 602, then the UE may receive feedback on r1 604, and vice-versa. For example, f1 may be a feedback message to be received on d1 602, f2 may be a feedback message to be transmitted on d1 602, f3 may be the feedback message to be transmitted on r1 604, and f4 may be the feedback message to be received on r1 604. The message corresponding to the feedback message may have a priority p1, p2, p3, p4, respectively, where p1>p2 and p3<p4. In such aspect, on resource d1 602 since p1>p2, the UE may receive the feedback message, such that the UE receives feedback message f1 and drops the transmission of the feedback message f2. On resource r1 604, although p3<p4, the UE may transmit the feedback message, due to the UE deciding to receive the feedback message on resource d1 602. In some aspects, for example, the UE may attribute equal priority to both resources d1 602, r1 604 in determining whether to transmit or receive.

In some aspects, the subband full duplex UE may have an absolute prioritization of transmitting or receiving on the feedback resource sets. For example, the subband full duplex UE may assign a priority to transmit/receive on resource sets d1 602, r1 604. The UE may decide to transmit/receive appropriate messages in d1 602, r1 604. For example, f1 may be a feedback message to be received on d1 602, f2 may be a feedback message to be transmitted on d1 602, f3 may be a feedback message to be transmitted on r1 604, and f4 may be a feedback message to be received on r1 604. In some aspects, the feedback message may have priority p1, p2, p3, p4, respectively where p1>p2 and p3<p4. In some aspects, the UE may prioritize to transmit on d1 602 and receive on r1 604. As such, on d1 602, the UE may transmit feedback message f2, even though p1>p2, and on r1 604 the UE may receive feedback message f4. In some aspects, the UE may prioritize to receive on d1 602, and transmit on r1 604. As such, on d1 602, the UE may receive feedback message f1, and on r1 604 the UE may transmit f3 (even though p3<p4).

In some aspects, the priority of transmission/reception on feedback resource sets d1 602, r1 604 may be based on the number of messages to be transmitted or received. For example, let $n_t, n_r$ be the number of transmit and receive feedback messages respectively on resource d1 602, r1 604. If $n_t > n_r$, then the UE may decide to make d1 602 (r1 604) to be transmit feedback resource. In some aspects, the UE may decide to transmit or receive feedback on resource sets by taking into account one or more of the aspects disclosed herein, alone or in combination.

In some aspects, the subband full duplex UE may account for transmission/reception conflicts for PSFCH when scheduling the transmission/reception for data (e.g., PSSCH). In some aspects, the resource selection may take into account the PSFCH availability. In some aspects, certain PSFCH may not be received (e.g., as discussed in the aspects of FIG. 6). If the UE has not transmitted a corresponding PSSCH in the first place, there would have been no feedback message to receive. As such, the UE may be configured to anticipate the lack of receiving a corresponding feedback message and not send the PSSCH whenever possible. For example, the UE may choose the set of resources not only based on the outcome of sensing, but also on the PSFCH availability. For example, assume resources (e.g., R1, R2, R3) are available to transmit control/data. Suppose transmitting in R1, R2 turns out that the UE may be receiving (and transmitting) PSFCH at the same resource. In such instances, the UE may choose R3 to transmit control/data such that PSFCH could be received in a different resource (e.g., not the same resource used for transmitting PSFCH to another UE).

Figure 7:
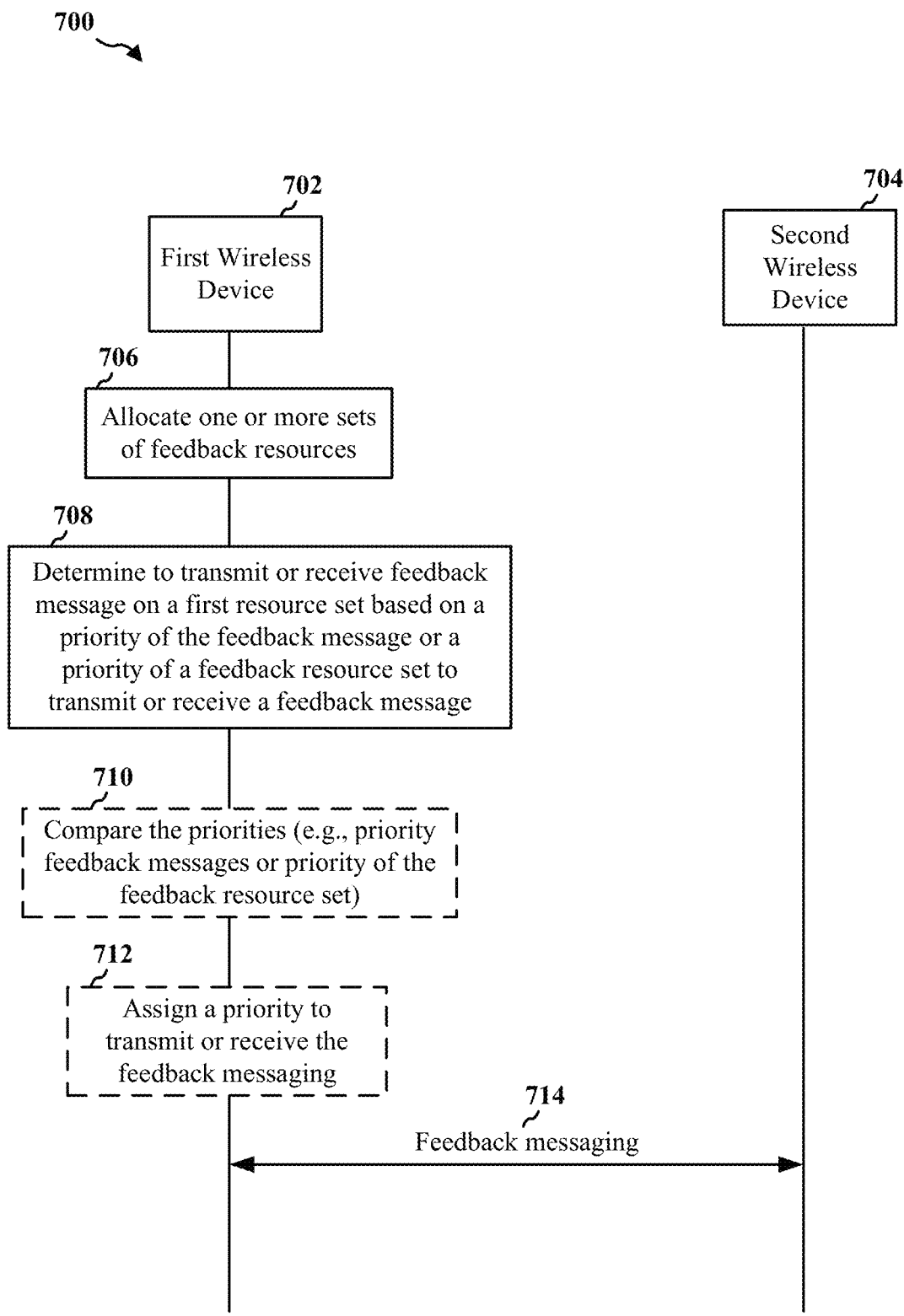
FIG. 7 is a call flow diagram of signaling between a first wireless device and a second wireless device.

FIG. 7 illustrates an example communication flow 700 between a first wireless device 702 and a second wireless device 704. The communication may be based on V2X, V2V, or D2D based communication directly from a transmitting device to a receiving device. The communication transmitting from device 702, 704 may be broadcast and received by multiple receiving devices within range of a particular transmitting device, as described in connection with FIG. 4. The first wireless device 702 may correspond to a first UE, and the second wireless device 704 may correspond to a second UE. For example, in the context of FIG. 1, the first wireless device 702 may correspond to at least UE 104, and the second wireless device may correspond to at least 104'. In another example, in the context of FIG. 3, the first wireless device 702 may correspond to the device 350, and the second wireless device 704 may correspond to the device 310.

As illustrated at 706, the first wireless device or UE 702, may allocate one or more sets of feedback resources. The UE may allocate the one or more sets of feedback resources in association with a second UE for transmission or reception of feedback message.

As illustrated at 708, the UE 702 may determine to transmit or receive the feedback message on a first resource set of the one or more sets of feedback resources. The UE 702 may determine to transmit or receive the feedback message on the first resource set of the one or more sets of feedback resources based on a priority of the feedback message or a priority of a feedback resource set to transmit or receive a feedback message. In some aspects, the UE 702 determining to transmit or receive the feedback message may be based on the priority of the feedback message. In some aspects, the UE 702 determining to transmit or receive the feedback message may be based on the priority of the feedback resource set to transmit or receive the feedback message. In some aspects, the UE 702 determining to transmit or receive the feedback message may be based on a number of feedback messages to be transmitted or received on the feedback resource set. In some aspects, the UE 702 determining to transmit or receive the feedback message may be further based on resource availability. Conflicts in the transmission or the reception of the feedback message may be accounted for in a scheduling of data transmission or reception.

In some aspects, for example as illustrated at 710, the UE 702 may compare the priority of the feedback message for the transmission or the reception on the first resource set and a priority of the feedback message for the transmission or the reception on a second resource set. The UE 702 to determine to transmit or receive the feedback message may be based on the priority of the feedback message. In some aspects, the transmission or the reception of the feedback message on the first resource set may be independent of the transmission or the reception of the feedback message on the second resource set. In some aspects, a first feedback message having a first priority may be scheduled for transmission on the first resource set and a second feedback message having a second priority may be scheduled for reception on the first resource set. A third feedback message having a third priority may be scheduled for transmission on the second resource set, and a fourth feedback message having a fourth priority may be scheduled for reception on the second resource set. The first priority may be compared against the second priority to determine the transmission or the reception of the first or second feedback messages on the first resource set. The third priority may be compared against the fourth priority to determine the transmission or the reception of the third or fourth feedback messages on the second resource set.

In some aspects, as further illustrated at 710, the UE 702 may compare the priority of the feedback resource set to transmit the feedback message on the first resource set and/or a priority of the feedback resource set to receive the feedback message on the first resource set. In some aspects, the UE 702 to determine to transmit or receive the feedback message may be based on the priority of the feedback resource set to transmit or receive the feedback message. In some aspects, a first feedback message having a first priority may be scheduled for transmission on the first resource set and a second feedback message having a second priority may be scheduled for reception on the first resource set. A third feedback message having a third priority may be scheduled for transmission on the second resource set, and a fourth feedback message having a fourth priority may be scheduled for reception on the second resource set. The first priority may be compared against the second priority to determine the transmission or the reception of the first or second feedback messages on the first resource set. The transmission or the reception of the third or fourth feedback messages on the second resource set may be based on the determination to transmit or receive the first or second feedback messages on the first resource set such that the UE 702 transmits and receives the feedback message on the first and second resource sets concurrently.

In some aspects, for example as illustrated at 712, the UE 702 may assign a priority to transmit or receive the feedback message on the first resource set and a second resource set. The UE 702 may transmit and receive the feedback message on the first and second resource sets concurrently.

As illustrated at 714, the UE 702 may transmit or receive the feedback message. The UE 702 may transmit or receive the feedback message based on the priority of the feedback message or the feedback resource set. The UE 702 may transmit or receive the feedback message to or from the second wireless device 704.

In some aspects, the UE 702 may transmit or receive the feedback message on the first resource set. The UE 702 may transmit or receive the feedback message to or from the second wireless device 704. The UE 702 may transmit or receive the feedback message on the first resource set based on results of a comparison of the priority of the feedback message. In some aspects, the transmission or the reception of the feedback message on a second resource set may be based on the transmission or the reception of the feedback message on the first resource set, such that the UE 702 transmits and receives the feedback message on the first and second resource sets concurrently.

Figure 8:
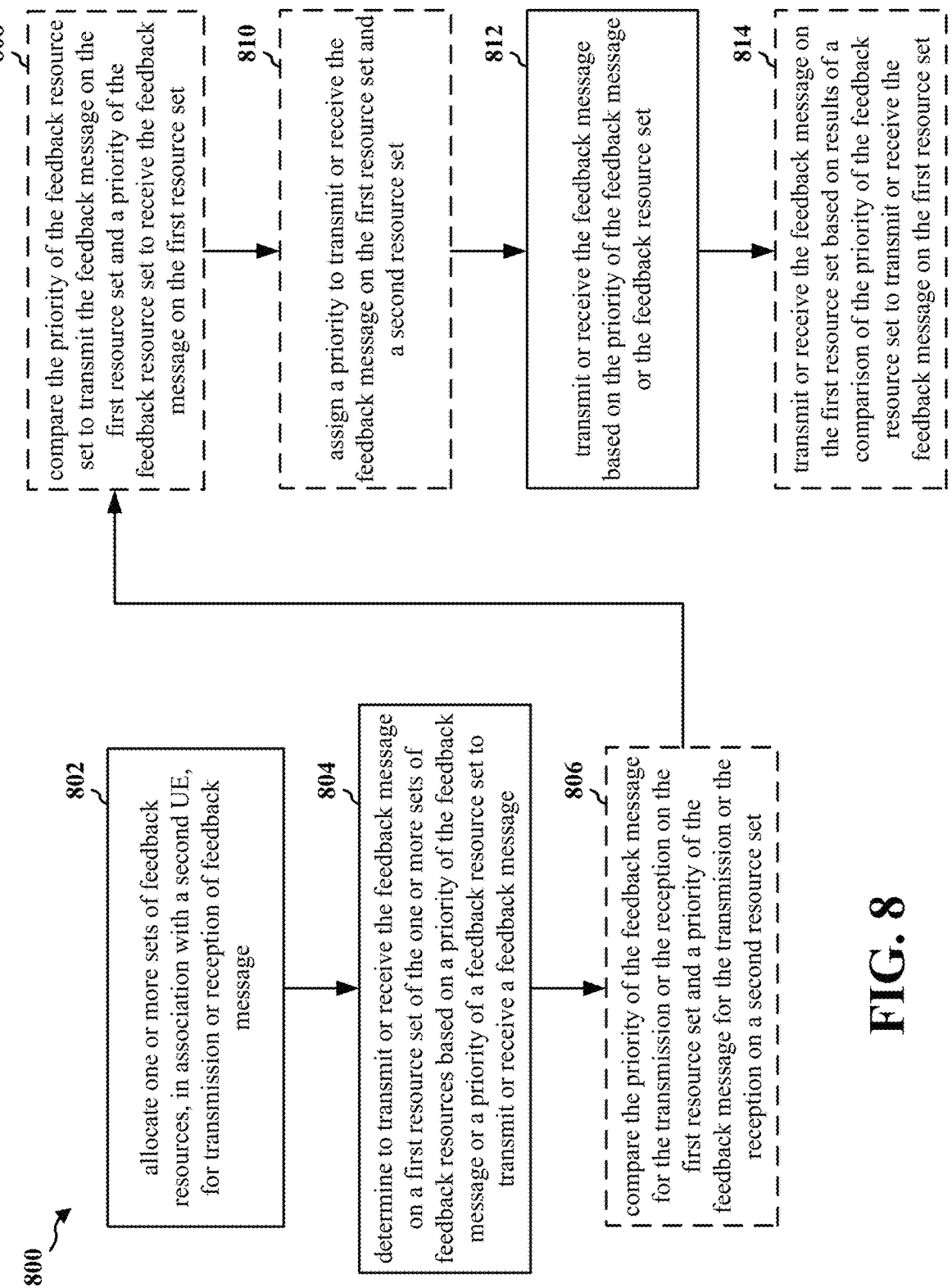
FIG. 8 is a flowchart of a method of wireless communication.

FIG. 8 is a flowchart 800 of a method of wireless communication. The method is performed by a UE or a component of a UE (e.g., the UE 104, 402, 404, 406, 408, device 310, wireless device 702, 704, the apparatus 902; the cellular baseband processor 904, which may include the memory 360 and which may be the entire device 350 or a component of the device, such as the TX processor 368, the RX processor 356, and/or the controller/processor 359). Among other examples, the UE may comprise a subband based full duplex UE. According to various aspects, one or more of the illustrated operations of the method may be omitted, transposed, and/or contemporaneously performed. Optional aspects are illustrated with a dashed line. The method may enable a UE operating as a full duplex device to transmit or receive feedback to or from other full duplex wireless devices or half duplex wireless devices.

At 802, the UE may allocate one or more sets of feedback resources. For example, 802 may be performed by allocation component 940 of apparatus 902. The UE may allocate the one or more sets of feedback resources in association with a second UE for transmission or reception of feedback message.

At 804, the UE may determine to transmit or receive the feedback message on a first resource set of the one or more sets of feedback resources. For example, 804 may be performed by determination component 942 of apparatus 904. The UE may determine to transmit or receive the feedback message on the first resource set of the one or more sets of feedback resources based on a priority of the feedback message or a priority of a feedback resource set to transmit or receive a feedback message. In some aspects, the UE determining to transmit or receive the feedback message may be based on the priority of the feedback message. In some aspects, the UE determining to transmit or receive the feedback message may be based on the priority of the feedback resource set to transmit or receive the feedback message. In some aspects, the UE determining to transmit or receive the feedback message may be based on a number of feedback messages to be transmitted or received on the feedback resource set. In some aspects, the UE determining to transmit or receive the feedback message may be further based on resource availability. Conflicts in the transmission or the reception of the feedback message may be accounted for in a scheduling of data transmission or reception.

In some aspects, for example at 806, the UE may compare the priority of the feedback message for the transmission or the reception on the first resource set and a priority of the feedback message for the transmission or the reception on a second resource set. For example, 806 may be performed by comparison component 944 of apparatus 902. The UE to determine to transmit or receive the feedback message may be based on the priority of the feedback message. In some aspects, the transmission or the reception of the feedback message on the first resource set may be independent of the transmission or the reception of the feedback message on the second resource set. In some aspects, a first feedback message having a first priority may be scheduled for transmission on the first resource set and a second feedback message having a second priority may be scheduled for reception on the first resource set. A third feedback message having a third priority may be scheduled for transmission on the second resource set, and a fourth feedback message having a fourth priority may be scheduled for reception on the second resource set. The first priority may be compared against the second priority to determine the transmission or the reception of the first or second feedback messages on the first resource set. The third priority may be compared against the fourth priority to determine the transmission or the reception of the third or fourth feedback messages on the second resource set.

In some aspects, for example at 808, the UE may compare the priority of the feedback resource set to transmit the feedback message on the first resource set and/or a priority of the feedback resource set to receive the feedback message on the first resource set. For example, 808 may be performed by comparison component 944 of apparatus 902. In some aspects, the UE to determine to transmit or receive the feedback message may be based on the priority of the feedback resource set to transmit or receive the feedback message. In some aspects, a first feedback message having a first priority may be scheduled for transmission on the first resource set and a second feedback message having a second priority may be scheduled for reception on the first resource set. A third feedback message having a third priority may be scheduled for transmission on the second resource set, and a fourth feedback message having a fourth priority may be scheduled for reception on the second resource set. The first priority may be compared against the second priority to determine the transmission or the reception of the first or second feedback messages on the first resource set. The transmission or the reception of the third or fourth feedback messages on the second resource set may be based on the determination to transmit or receive the first or second feedback messages on the first resource set such that the UE transmits and receives the feedback message on the first and second resource sets concurrently.

In some aspects, for example at 810, the UE may assign a priority to transmit or receive the feedback message on the first resource set and a second resource set. For example, 810 may be performed by assign component 946 of apparatus 902. The UE may transmit and receive the feedback message on the first and second resource sets concurrently.

At 812, the UE may transmit or receive the feedback message. For example, 812 may be performed by feedback component 948 of apparatus 902. The UE may transmit or receive the feedback message based on the priority of the feedback message or the feedback resource set.

In some aspects, for example at 814, the UE may transmit or receive the feedback message on the first resource set. For example, 814 may be performed by feedback component 948 of apparatus 902. The UE may transmit or receive the feedback message on the first resource set based on results of a comparison of the priority of the feedback message. In some aspects, the transmission or the reception of the feedback message on a second resource set may be based on the transmission or the reception of the feedback message on the first resource set, such that the UE transmits and receives the feedback message on the first and second resource sets concurrently.

Figure 9:
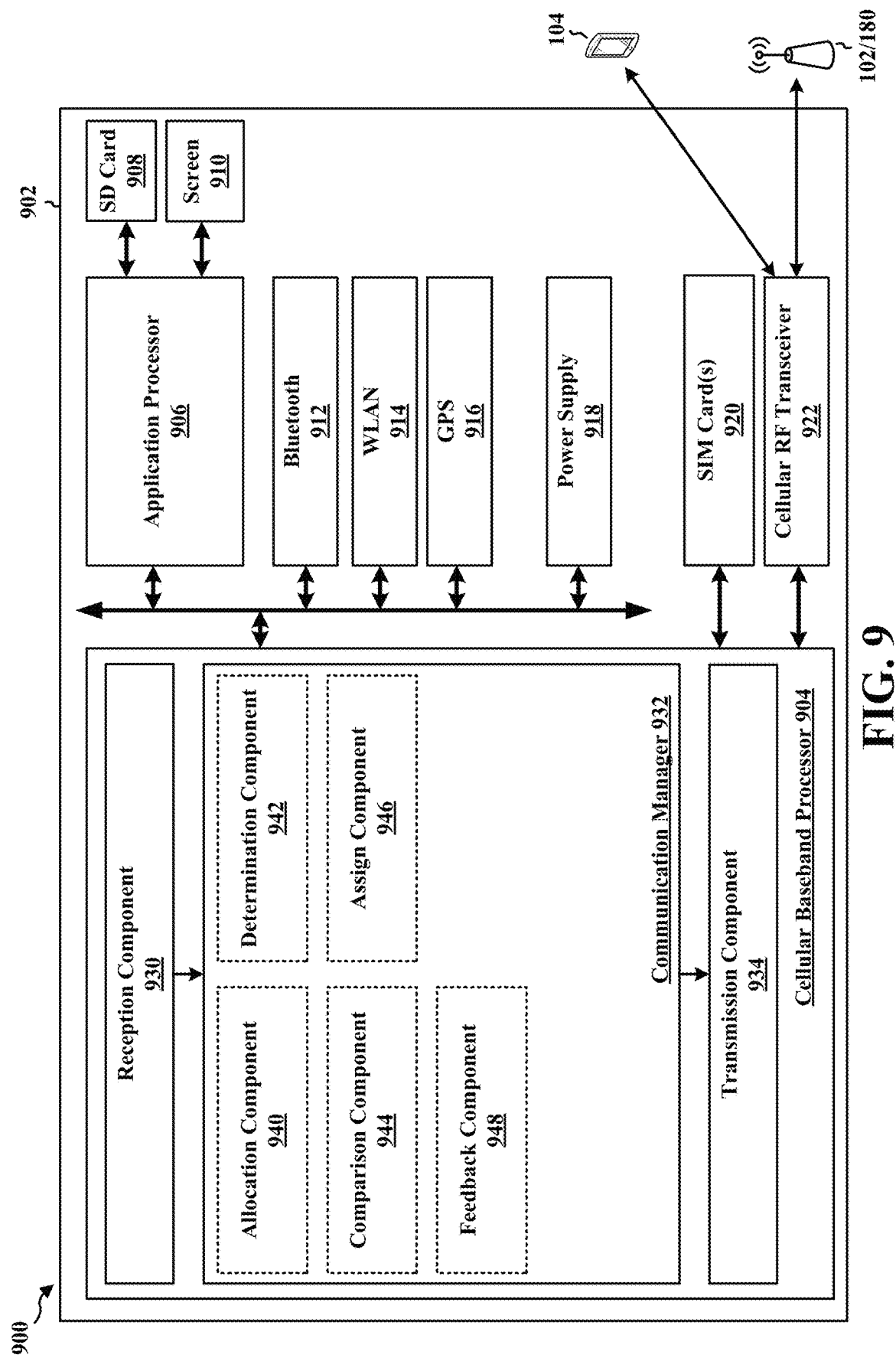
FIG. 9 is a diagram illustrating an example of a hardware implementation for an apparatus employing a processing system.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the aforediscussed additional modules of the apparatus 902.

The communication manager 932 includes an allocation component 940 that is configured to allocate one or more sets of feedback resources, e.g., as described in connection with 802 of FIG. 8. The communication manager 932 further includes a determination component 942 that is configured to determine to transmit or receive the feedback message on a first resource set of the one or more sets of feedback resources, e.g., as described in connection with 804 of FIG. 8. The communication manager 932 further includes a comparison component 944 that is configured to compare the priority of the feedback message for the transmission or the reception on the first resource set and a priority of the feedback message for the transmission or the reception on a second resource set, e.g., as described in connection with 806 of FIG. 8. The comparison component 944 may be configured to compare the priority of the feedback resource set to transmit the feedback message on the first resource set and/or a priority of the feedback resource set to receive the feedback message on the first resource set, e.g., as described in connection with 808 of FIG. 8. The communication manager 932 further includes an assign component 946 that is configured to assign a priority to transmit or receive the feedback message on the first resource set and a second resource set, e.g., as described in connection with 810 of FIG. 8. The communication manager 932 further includes a feedback component 948 that is configured to transmit or receive the feedback message, e.g., as described in connection with 812 of FIG. 8. The feedback component 948 may be configured to transmit or receive the feedback message on the first resource set, e.g., as described in connection with 814 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for allocating one or more sets of feedback resources, in association with a second UE, for transmission or reception of feedback message. The apparatus includes means for determining to transmit or receive the feedback message on a first resource set of the one or more sets of feedback resources based on a priority of the feedback message or a priority of a feedback resource set to transmit or receive a feedback message. The apparatus includes means for transmitting or receiving the feedback message based on the priority of the feedback message or the feedback resource set. The apparatus further includes means for comparing the priority of the feedback message for the transmission or the reception on the first resource set and a priority of the feedback message for the transmission or the reception on a second resource set. The apparatus further includes means for comparing the priority of the feedback resource set to transmit the feedback message on the first resource set and a priority of the feedback resource set to receive the feedback message on the first resource set. The apparatus further includes means for transmitting or receiving the feedback message on the first resource set based on results of a comparison of the priority of the feedback resource set to transmit or receive the feedback message on the first resource set. The apparatus further includes means for assigning a priority to transmit or receive the feedback message on the first resource set and a second resource set. The UE transmits and receives the feedback message on the first and second resource sets concurrently. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a subband full duplex UE comprising allocating one or more sets of feedback resources, in association with a second UE, for transmission or reception of feedback message; determining to transmit or receive the feedback message on a first resource set of the one or more sets of feedback resources based on a priority of the feedback message or a priority of a feedback resource set to transmit or receive a feedback message; and transmitting or receiving the feedback message based on the priority of the feedback message or the feedback resource set.

In Aspect 2, the method of Aspect 1 further includes that the determining to transmit or receive the feedback message is based on the priority of the feedback message.

In Aspect 3, the method of Aspect 1 or 2 further includes comparing the priority of the feedback message for the transmission or the reception on the first resource set and a priority of the feedback message for the transmission or the reception on a second resource set.

In Aspect 4, the method of any of Aspects 1-3 further includes the transmission or the reception of the feedback message on the first resource set is independent of the transmission or the reception of the feedback message on the second resource set.

In Aspect 5, the method of any of Aspects 1-4 further includes that a first feedback message having a first priority is scheduled for transmission on the first resource set and a second feedback message having a second priority is scheduled for reception on the first resource set, wherein a third feedback message having a third priority is scheduled for transmission on the second resource set and a fourth feedback message having a fourth priority is scheduled for reception on the second resource set.

In Aspect 6, the method of any of Aspects 1-5 further includes that the first priority is compared against the second priority to determine the transmission or the reception of the first or second feedback messages on the first resource set, wherein the third priority is compared against the fourth priority to determine the transmission or the reception of the third or fourth feedback messages on the second resource set.

In Aspect 7, the method of any of Aspects 1-6 further includes that the determining to transmit or receive the feedback message is based on the priority of the feedback resource set to transmit or receive the feedback message.

In Aspect 8, the method of any of Aspects 1-7 further includes comparing the priority of the feedback resource set to transmit the feedback message on the first resource set and a priority of the feedback resource set to receive the feedback message on the first resource set; and transmitting or receiving the feedback message on the first resource set based on results of a comparison of the priority of the feedback resource set to transmit or receive the feedback message on the first resource set.

In Aspect 9, the method of any of Aspects 1-8 further includes that the transmission or the reception of the feedback message on a second resource set is based on the transmission or the reception of the feedback message on the first resource set, such that the UE transmits and receives the feedback message on the first and second resource sets concurrently.

In Aspect 10, the method of any of Aspects 1-9 further includes that a first feedback message having a first priority is scheduled for transmission on the first resource set and a second feedback message having a second priority is scheduled for reception on the first resource set, wherein a third feedback message having a third priority is scheduled for transmission on the second resource set and a fourth feedback message having a fourth priority is scheduled for reception on the second resource set.

In Aspect 11, the method of any of Aspects 1-10 further includes that the first priority is compared against the second priority to determine the transmission or the reception of the first or second feedback messages on the first resource set, wherein the transmission or the reception of the third or fourth feedback messages on the second resource set is based on the determination to transmit or receive the first or second feedback messages on the first resource set such that the UE transmits and receives the feedback message on the first and second resource sets concurrently.

In Aspect 12, the method of any of Aspects 1-11 further includes assigning a priority to transmit or receive the feedback message on the first resource set and a second resource set, wherein the UE transmits and receives the feedback message on the first and second resource sets concurrently.

In Aspect 13, the method of any of Aspects 1-12 further includes that the determining to transmit or receive the feedback message is based on a number of feedback messages to be transmitted or received on the feedback resource set.

In Aspect 14, the method of any of Aspects 1-13 further includes that the determining to transmit or receive the feedback message is further based on resource availability.

In Aspect 15, the method of any of Aspects 1-14 further includes that conflicts in the transmission or the reception of the feedback message are accounted for in a scheduling of data transmission or reception.

Aspect 16 is a system or apparatus including means for implementing a method or realizing an apparatus as in any of Aspects 1-15.

Aspect 17 is a system including one or more processor and memory in electronic communication with the one or more processors to cause the system or apparatus to implement a method as in any of Aspects 1-15.

Aspect 18 is a non-transitory computer readable medium storing instructions executable by one or more processors to cause the one or more processors to implement a method as in any of Aspects 1-15.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a subband based full duplex user equipment (UE), comprising:
   allocating a plurality of sets of feedback resources, in association with a second UE, for transmission or reception of feedback messages;
   determining to transmit or receive a first feedback message on a first resource set and transmit or receive a second feedback message on a second resource set of the plurality of sets of feedback resources, wherein determination of transmission or reception of the first and second feedback messages is based on a priority of the feedback messages or a priority of a feedback resource set to transmit or receive a feedback message; and
   transmitting or receiving the first and second feedback messages based on the priority of the feedback messages or the feedback resource sets.

2. The method of claim 1, wherein the determining to transmit or receive the first and second feedback messages is based on the priority of the feedback messages.

3. The method of claim 2, further comprising:
   comparing the priority of the first feedback message for the transmission or the reception on the first resource set and a priority of the second feedback message for the transmission or the reception on the second resource set.

4. The method of claim 3, wherein the transmission or the reception of the first feedback message on the first resource set is independent of the transmission or the reception of the second feedback message on the second resource set.

5. A method of wireless communication at a subband based full duplex user equipment (UE), comprising:
   allocating one or more sets of feedback resources, in association with a second UE, for transmission or reception of feedback message;
   determining to transmit or receive the feedback message on a first resource set of the one or more sets of feedback resources based on a priority of the feedback message or a priority of a feedback resource set to transmit or receive a feedback message, wherein the determining to transmit or receive the feedback message is based on the priority of the feedback message;
   comparing the priority of the feedback message for the transmission or the reception on the first resource set and a priority of the feedback message for the transmission or the reception on a second resource set; and
   transmitting or receiving the feedback message based on the priority of the feedback message or the feedback resource set, wherein a first feedback message having a first priority is scheduled for transmission on the first resource set and a second feedback message having a second priority is scheduled for reception on the first resource set, wherein a third feedback message having a third priority is scheduled for transmission on the second resource set and a fourth feedback message having a fourth priority is scheduled for reception on the second resource set.

6. The method of claim 5, wherein the first priority is compared against the second priority to determine the transmission or the reception of the first or second feedback messages on the first resource set, wherein the third priority is compared against the fourth priority to determine the transmission or the reception of the third or fourth feedback messages on the second resource set.

7. The method of claim 1, wherein the determining to transmit or receive the feedback messages is based on the priority of the first or second feedback resource sets to transmit or receive the feedback messages.

8. A method of wireless communication at a subband based full duplex user equipment (UE), comprising:
   allocating one or more sets of feedback resources, in association with a second UE, for transmission or reception of feedback message;
   determining to transmit or receive the feedback message on a first resource set of the one or more sets of feedback resources based on a priority of the feedback message or a priority of a feedback resource set to transmit or receive a feedback message, wherein the determining to transmit or receive the feedback message is based on the priority of the feedback resource set to transmit or receive the feedback message;
   comparing the priority of the feedback resource set to transmit the feedback message on the first resource set and a priority of the feedback resource set to receive the feedback message on the first resource set;
   transmitting or receiving the feedback message based on the priority of the feedback message or the feedback resource set; and
   transmitting or receiving the feedback message on the first resource set based on results of a comparison of the priority of the feedback resource set to transmit or receive the feedback message on the first resource set.

9. The method of claim 8, wherein the transmission or the reception of the feedback message on a second resource set is based on the transmission or the reception of the feedback message on the first resource set, such that the UE transmits and receives the feedback message on the first and second resource sets concurrently.

10. The method of claim 8, wherein a first feedback message having a first priority is scheduled for transmission on the first resource set and a second feedback message having a second priority is scheduled for reception on the first resource set, wherein a third feedback message having a third priority is scheduled for transmission on the second resource set and a fourth feedback message having a fourth priority is scheduled for reception on the second resource set.

11. The method of claim 10, wherein the first priority is compared against the second priority to determine the transmission or the reception of the first or second feedback messages on the first resource set, wherein the transmission or the reception of the third or fourth feedback messages on the second resource set is based on the determination to transmit or receive the first or second feedback messages on the first resource set such that the UE transmits and receives the feedback message on the first and second resource sets concurrently.

12. The method of claim 7, further comprising:
   assigning a priority to transmit or receive the first feedback message on the first resource set and the second feedback message on the second resource set, wherein the UE transmits and receives the first and second feedback messages on the first and second resource sets concurrently.

13. A method of wireless communication at a subband based full duplex user equipment (UE), comprising:
   allocating one or more sets of feedback resources, in association with a second UE, for transmission or reception of feedback message;
   determining to transmit or receive the feedback message on a first resource set of the one or more sets of feedback resources based on a priority of the feedback message or a priority of a feedback resource set to transmit or receive a feedback message, wherein the determining to transmit or receive the feedback message is based on a number of feedback messages to be transmitted or received on the feedback resource set; and
   transmitting or receiving the feedback message based on the priority of the feedback message or the feedback resource set.

14. The method of claim 1, wherein the determining to transmit or receive the first and second feedback messages is further based on resource availability.

15. The method of claim 14, wherein conflicts in the transmission or the reception of the first and second feedback messages are accounted for in a scheduling of data transmission or reception.

16. An apparatus for wireless communication at a subband based full duplex user equipment (UE), comprising:
   a memory; and
   at least one processor coupled to the memory and configured to:
      allocate a plurality of sets of feedback resources, in association with a second UE, for transmission or reception of feedback messages;
      determine to transmit or receive a first feedback message on a first resource set and transmit or receive a second feedback message on a second resource set of the plurality of sets of feedback resources, wherein determination of transmission or reception of the first and second feedback messages is based on a priority of the feedback messages or a priority of a feedback resource set to transmit or receive a feedback message; and transmit or receive the first and second feedback messages based on the priority of the feedback messages or the feedback resource sets.

17. The apparatus of claim 16, wherein to determine to transmit or receive the first and second feedback messages is based on the priority of the feedback messages.

18. The apparatus of claim 17, wherein the at least one processor is further configured to:

compare the priority of the first feedback message for the transmission or the reception on the first resource set and a priority of the second feedback message for the transmission or the reception on the second resource set.

19. The apparatus of claim 18, wherein the transmission or the reception of the first feedback message on the first resource set is independent of the transmission or the reception of the second feedback message on the second resource set.

20. An apparatus for wireless communication at a sub-band based full duplex user equipment (UE), comprising:

a memory; and at least one processor coupled to the memory and configured to:

allocate one or more sets of feedback resources, in association with a second UE, for transmission or reception of feedback message;

determine to transmit or receive the feedback message on a first resource set of the one or more sets of feedback resources based on a priority of the feedback message or a priority of a feedback resource set to transmit or receive a feedback message, wherein to determine to transmit or receive the feedback message is based on the priority of the feedback message;

compare the priority of the feedback message for the transmission or the reception on the first resource set and a priority of the feedback message for the transmission or the reception on a second resource set; and transmit or receive the feedback message based on the priority of the feedback message or the feedback resource set, wherein a first feedback message having a first priority is scheduled for transmission on the first resource set and a second feedback message having a second priority is scheduled for reception on the first resource set, wherein a third feedback message having a third priority is scheduled for transmission on the second resource set and a fourth feedback message having a fourth priority is scheduled for reception on the second resource set.

21. The apparatus of claim 16, wherein to determine to transmit or receive the feedback messages is based on the priority of the first or second feedback resource sets to transmit or receive the feedback messages.

22. An apparatus for wireless communication at a sub-band based full duplex user equipment (UE), comprising:

a memory; and at least one processor coupled to the memory and configured to:

allocate one or more sets of feedback resources, in association with a second UE, for transmission or reception of feedback message;

determine to transmit or receive the feedback message on a first resource set of the one or more of feedback resources based on a priority of the feedback message or a priority of a feedback resource set to transmit or receive a feedback message, wherein to determine to transmit or receive the feedback message is based on the priority of the feedback resource set to transmit or receive the feedback message;

compare the priority of the feedback resource set to transmit the feedback message on the first resource set and a priority of the feedback resource set to receive the feedback message on the first resource set;

transmit or receive the feedback message based on the priority of the feedback message or the feedback resource set; and transmit or receive the feedback message on the first resource set based on results of a comparison of the priority of the feedback resource set to transmit or receive the feedback message on the first resource set.

23. The apparatus of claim 21, wherein the at least one processor is further configured to:

assign a priority to transmit or receive the first feedback message on the first resource set and the second feedback message on the second resource set, wherein the UE transmits and receives the first and second feedback messages on the first and second resource sets concurrently.

24. An apparatus for wireless communication at a sub-band based full duplex user equipment (UE), comprising:

means for allocating a plurality of sets of feedback resources, in association with a second UE, for transmission or reception of feedback messages;

mean for determining to transmit or receive a first feedback message on a first resource set and transmit or receive a second feedback message on a second resource set of the plurality of sets of feedback resources, wherein determination of transmission or reception of the first and second feedback messages is based on a priority of the feedback messages or a priority of a feedback resource set to transmit or receive a feedback message; and means for transmitting or receiving the first and second feedback messages based on the priority of the feedback messages or the feedback resource sets.

25. The apparatus of claim 24, wherein the determining to transmit or receive the first and second feedback messages is based on the priority of the feedback messages.

26. The apparatus of claim 25, further comprising:

means for comparing the priority of the first feedback message for the transmission or the reception on the first resource set and a priority of the second feedback message for the transmission or the reception on the second resource set.

27. The apparatus of claim 24, wherein the determining to transmit or receive the feedback messages is based on the priority of the first or second feedback resource sets to transmit or receive the feedback messages.

28. An apparatus for wireless communication at a sub-band based full duplex user equipment (UE), comprising:

means for allocating one or more sets of feedback resources, in association with a second UE, for transmission or reception of feedback message;

mean for determining to transmit or receive the feedback message on a first resource set of the one or more sets of feedback resources based on a priority of the feedback message or a priority of a feedback resource set to transmit or receive a feedback message;

means for comparing the priority of the feedback resource set to transmit the feedback message on the first resource set and a priority of the feedback resource set to receive the message on the first resource set;

means for transmitting or receiving the feedback message based on the priority of the feedback message or the feedback resource set; and means for transmitting or receiving the feedback message on the first resource set based on results of a comparison of the priority of the feedback resource set to transmit or receive the feedback message on the first resource set.

29. The apparatus of claim 27, further comprising:
means for assigning a priority to transmit or receive the first feedback message on the first resource set and the second feedback message on the second resource set, wherein the UE transmits and receives the first and second feedback messages on the first and second resource sets concurrently.

30. A non-transitory computer-readable medium storing computer executable code, the code when executed by a processor causes the processor to:

allocate a plurality of sets of feedback resources, in association with a second UE, for transmission or reception of feedback messages;

determine to transmit or receive a first feedback message on a first resource set transmit or receive a second feedback message on a second resource set of the plurality of sets of feedback resources, wherein determination of transmission or reception of the first and second feedback messages is based on a priority of the feedback messages or a priority of a feedback resource set to transmit or receive a feedback message; and transmit or receiving the first and second feedback messages based on the priority of the feedback messages or the feedback resource sets.

* * * * *